United States Patent
Lin et al.

(10) Patent No.: US 9,794,839 B2
(45) Date of Patent: Oct. 17, 2017

(54) MECHANISM FOR RADIO LINK MONITORING AND RADIO LINK FAILURE HANDLING IN SMALL CELL NETWORKS

(71) Applicant: MEDIATEK INC., Hsinchu (TW)

(72) Inventors: Shiang-Jiun Lin, Hsinchu (TW); Yuanyuan Zhang, Beijing (CN); Per Johan Mikael Johansson, Kungsangen (SE)

(73) Assignee: MEDIATEK INC., HsinChu (TW)

( * ) Notice: Subject to any disclaimer, the term of this patent is extended or adjusted under 35 U.S.C. 154(b) by 86 days.

(21) Appl. No.: 14/636,441

(22) Filed: Mar. 3, 2015

(65) Prior Publication Data

US 2015/0181479 A1    Jun. 25, 2015

Related U.S. Application Data

(63) Continuation of application No. PCT/CN2014/070711, filed on Jan. 16, 2014.

(30) Foreign Application Priority Data

Jan. 18, 2013  (WO) ................ PCT/CN2013/070723

(51) Int. Cl.
   *H04L 1/00* (2006.01)
   *H04W 36/00* (2009.01)
   (Continued)

(52) U.S. Cl.
   CPC ....... *H04W 36/0072* (2013.01); *H04W 24/04* (2013.01); *H04W 36/0055* (2013.01);
   (Continued)

(58) Field of Classification Search
   CPC .. H04B 7/2121; H04B 7/2123; H04B 10/032; H04J 2203/0069; H04J 14/0287;
   (Continued)

(56) References Cited

U.S. PATENT DOCUMENTS 8,488,443 B2 *  7/2013  Lee ...................... H04L 5/0007
                                                          370/216
8,526,338 B2    9/2013  Pan et al. ...................... 370/280
(Continued)

FOREIGN PATENT DOCUMENTS

CN      101567713 A1   10/2009
CN      102448078 A     5/2012
(Continued)

OTHER PUBLICATIONS

EPO, Search Report for the EP patent application 14740194.7 dated Nov. 24, 2015 (13 pages).

(Continued)

*Primary Examiner* — Dady Chery
(74) *Attorney, Agent, or Firm* — Imperium Patent Works; Zheng Jin (57) ABSTRACT

A method of radio link monitoring (RLM) and radio link failure (RLF) handling over a small cell network is proposed. In a wireless network, a user equipment (UE) establishes a radio resource control (RRC) connection with a base station (eNB), which is UE anchor. The UE applies carrier aggregation for multiple component carriers (CCs) configured as multiple serving cells. The aggregated serving cells are served by the anchor eNB and other drift eNB(s). The UE performs RLM/RLF over PCELL and SCELL belonging to corresponding cell groups. When RLF happens in a serving cell, the UE and the eNB apply certain actions over the serving cell or all serving cells in the group. RLF procedures in anchor eNB and in drift eNB are proposed. Both UE side and network side behaviors are included.

17 Claims, 6 Drawing Sheets (51) Int. Cl.
*H04W 24/04* (2009.01)
*H04W 76/02* (2009.01)
*H04L 5/00* (2006.01)

(52) U.S. Cl.
CPC ..... *H04W 36/0061* (2013.01); *H04W 76/027* (2013.01); *H04W 76/028* (2013.01); *H04L 5/001* (2013.01); *H04W 76/025* (2013.01)

(58) Field of Classification Search
CPC .. H04J 14/0289; H04J 14/029; H04J 14/0291; H04J 14/0293; H04J 14/0294; H04Q 2213/394; H04W 72/04; H04W 72/12; H04L 41/0668; H04L 45/22; H04L 45/28
USPC .................................. 370/216, 329, 228, 242
See application file for complete search history.

(56) References Cited

U.S. PATENT DOCUMENTS

| | | | |
|---|---|---|---|
| 2012/0281548 A1* | 11/2012 | Lin ..................... | H04W 36/30 370/242 |
| 2013/0010706 A1 | 1/2013 | Kela et al. ............. | 370/329 |
| 2014/0050113 A1 | 2/2014 | Rosa et al. ............ | 370/252 |
| 2015/0078286 A1 | 3/2015 | Kim et al. ............. | 370/329 |

FOREIGN PATENT DOCUMENTS

| | | |
|---|---|---|
| CN | 102870450 A | 1/2013 |
| EP | 2849357 A1 | 3/2015 |
| WO | WO2011100673 A1 | 8/2011 |
| WO | WO2012087006 A1 | 6/2012 |
| WO | WO2012146305 A1 | 11/2012 |
| WO | WO2012165875 A2 | 12/2012 |
| WO | WO2013168917 A1 | 11/2013 |

OTHER PUBLICATIONS

3GPP TSG-RAN WG2 Meeting #83 R2-132920, Broadcom Corp., Mobility Robustness with Dual Connectivity, Barcelona, Spain dated Aug. 19-23, 2013 (5 pages).

3GPP TSG RAN WG1 Meeting #74 R1-133558, Hitachi Ltd., Physical Layer Impact of Dual Connectivity, Barcelona, Spain dated Aug. 19-23, 2013 (3 pages).

3GPP TSG-RAN WG2 #83bis R2-133236, InterDigital Communications, MAC Aspects of Dual Connectivity, Ljubljana, Slovenia dated Oct. 7-11, 2013 (5 pages).

International Search Report and Written Opinion of International Search Authority for PCT/CN2014/070711 dated Apr. 3, 2014 (12 pages).

* cited by examiner

FIG. 7
RLF ON DRIFT SERVING CELL

MECHANISM FOR RADIO LINK MONITORING AND RADIO LINK FAILURE HANDLING IN SMALL CELL NETWORKS

CROSS REFERENCE TO RELATED APPLICATIONS

This application is filed under 35 U.S.C. §111(a) and is based on and hereby claims priority under 35 U.S.C. §120 and §365(c) from International Application No. PCT/CN2014/070711, with an international filing date of Jan. 16, 2014, which in turn claims priority from International Application No. PCT/CN2013/070723, filed on Jan. 18, 2013. This application is a continuation of International Application No. PCT/CN2014/070711, which claims priority from International Application No. PCT/CN2013/070723. International Application No. PCT/CN2014/070711 is pending as of the filing date of this application, and the United States is a designated state in International Application No. PCT/CN2014/070711. This application claims the benefit under 35 U.S.C. §119 from International Application No. PCT/CN2013/070723. The disclosure of each of the foregoing documents is incorporated herein by reference.

TECHNICAL FIELD

The disclosed embodiments relate generally to radio link monitoring (RLM) and radio link failure (RLF) handling, and, more particularly, to RLM and RLF handling in small cell networks.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Radio link monitoring (RLM) is a mechanism for a UE to monitor the quality of a downlink (DL) for determining if the radio link is good enough to continue transmission. For example, the UE shall monitor the DL quality based on cell-specific reference signal (CRS) to detect the downlink radio link quality for the serving cell. The UE shall also compare the estimated DL quality to thresholds $Q_{OUT}$ and $Q_{IN}$ for monitoring the downlink radio link quality of the serving cell. In addition to RLM, the UE shall consider radio link failure (RLF) to be detected upon physical layer problems based on N310/N311/T310 mechanism, random access problem indication from MAC layer, and indication from RLC layer that the maximum number of retransmission has been reached. Once RLF is detected, the UE gathers and stores RLF information and attempts RRC connection reestablishment. If such attempt fails, the UE goes back to RRC_IDLE. The UE may indicate the availability of the RLF report to eNB and report the RLF information to eNB upon request after successful RRC connection reestablishment or RRC connection setup.

In LTE Rel-10, the concept of carrier aggregation (CA) has been introduced to enhance the system throughput. With CA, two or more CCs are aggregated to support wider transmission bandwidth up to 100 MHz. A Rel-10 UE with reception and/or transmission capabilities for CA can simultaneously receive and/or transmit on multiple CCs corresponding to multiple serving cells. When CA is configured, the UE has only one RRC connection with the network. At RRC connection establishment/reestablishment or handover, one serving cell provides the NAS mobility information. At RRC connection reestablishment or handover, one serving cell provides the security input. This cell is referred to as the primary serving cell (PCELL), and other cells are referred to as the secondary serving cells (SCELLs). Depending on UE capabilities, SCELLs can be configured to form together with the PCELL as a set of serving cells.

In LTE Rel-12 and after, besides the normal eNBs, small eNBs with low transmission power and simplified protocol stacks/functionalities are introduced into E-UTRAN, which is referred to as small cell networks. The small cell architecture can be used to enhance the data throughput and to reduce the mobility signaling overhead. Instead of distributed operation, it is believed that an anchor-based architecture is a promising architecture to be operated in the small cell network. In UE anchor-based structure, a UE is housed in an eNB, which is referred to as an anchor eNB of the UE. UE anchor is UE specific, a UE anchor is a point where the Core Network connection of the UE is terminated, that does not have to be relocated when the UE moves in a local area covered by cells of multiple base-stations. UE serving cell(s) can be controlled by an eNB that is different from the anchor eNB, which is referred to as a drift eNB of the UE. When the UE is served by both anchor eNB and drift eNB, the control of the UE and the user plane functionality is split between the anchor eNB and the drift eNB.

In current LTE specification, radio link monitoring (RLM) and radio link failure (RLF) detection is only applied on PCELL, not on SCELLs. This is because in LTE Rel-10, carrier aggregation is mainly for aggregation cells in the same eNB, i.e., intra-eNB CA. In intra-eNB CA, the PCELL and SCELL share the same scheduler that is located in the same serving eNB. It is assumed that the serving eNB can detect poor link quality of SCELLs from Channel Quality Indicator (CQI) reports and/or existing RRM measurement reports from PCELL.

In UE anchor-based architecture, the anchor eNB and the drift eNB may not be physically collocated. Assume that an Xn interface is introduced for communication between the anchor eNB and the drift eNB. To avoid the backhaul delay and overhead due to information exchange between the anchor eNB and the drift eNB, and to improve flexibility and efficiency of scheduling, independent schedulers are located in the anchor eNB and the drift eNB. However, the impact of latency and overhead due to cell information exchange through the Xn interface is seriously concerned, and the channel state information of each cell should be independently report to the corresponding eNB. As a result, the anchor eNB may not be in complete control of link qualities of cells in the drift eNB. UE data transmission, UE power consumption, as well as UE user experience will be influenced if link failure occurs in the drift eNB but unknown to the anchor eNB.

A solution is sought for RLM/RLF procedures in the anchor eNB and in the drift eNB in anchor-based small cell networks.

SUMMARY

A method of radio link monitoring (RLM) and radio link failure (RLF) handling over a small cell network is proposed. In a wireless network, a user equipment (UE) establishes a radio resource control (RRC) connection with a base station (eNB), which is UE anchor. The UE applies carrier aggregation for multiple component carriers (CCs) configured as multiple serving cells. The aggregated serving cells can be in the same eNB or in the other eNB, i.e., the drift eNB. The UE performs radio link monitoring over a primary serving cell (PCELL). The UE also performs radio link monitoring over a secondary serving cell (SCELL). The SCELL belongs to a cell group. When the radio link problem, i.e., RLF, happens in a serving cell, the UE and the eNB apply certain actions over the serving cell or all serving cells in the group. RLF procedures in anchor eNB and in drift eNB are proposed. Both UE side and network side behaviors are included.

In one novel aspect, the RLM/RLF configured SCELL may be a first activated serving cell in the cell group, a serving cell configured with PUCCH resource in the cell group, a serving cell used as timing advance reference or pathloss reference in the cell group, and/or a serving cell explicitly configured by the network. In one embodiment, the UE associates a first MAC entity with the anchor eNB in handling scheduling from the anchor eNB, and associates a second MAC entity with the drift eNB in handling scheduling from the drift eNB.

In another novel aspect, when RLF occurs in PCELL, the UE sends an RLF indicator to the drift eNB. The RLF indicator may include a suggested cell list for handover. The drift eNB passes the RLF indicator to the anchor eNB so that the anchor eNB can perform PCELL change through handover procedure to the drift eNB. For example, the anchor eNB forwards DL/UL buffered to the drift eNB through the Xn interface. The drift eNB then sends an RRC connection reconfiguration message to the UE with mobility information for PCELL change and anchor eNB change. The UE then re-associates its PHY, MAC, RLC, PDCP entities to the drift eNB, which becomes the new anchor eNB for the UE. Finally, the UE replies an RRC connection complete message back to the new anchor eNB.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In 3GPP Long-Term Evolution (LTE) Rel-12 and after, besides normal base stations, small base stations with low transmission power and simplified protocol stacks and functionalities are introduced into E-UTRAN, which is referred to as small cell networks. The small cell architecture can be used to enhance the data throughput and to reduce the mobility signaling overhead. Instead of distributed operation, it is believed that an anchor-based architecture is a promising architecture to be operated in the small cell network.

Figure 1:
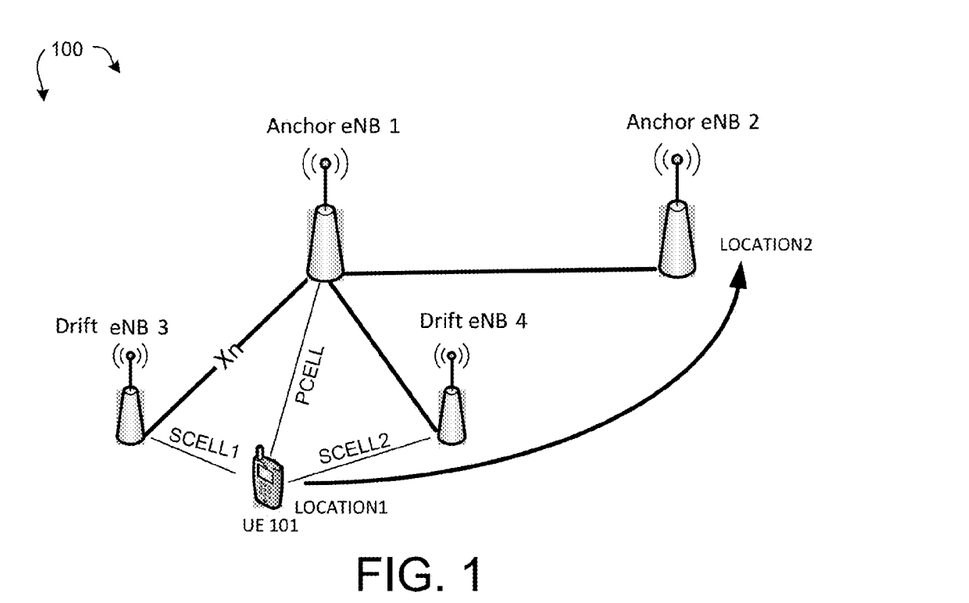
FIG. 1 illustrates a small cell network with user equipment (UE) anchor-based architecture in accordance with one novel aspect.

FIG. 1 illustrates a small cell network 100 with user equipment (UE) anchor-based architecture in accordance with one novel aspect. Small cell network 100 comprises UE 101, anchor eNB1, anchor eNB2, drift eNB3, and drift eNB4. In UE anchor-based structure, UE anchor is UE specific, a UE anchor is a point where the Core Network connection of the UE is terminated, that does not have to be relocated when the UE moves in a local area covered by cells of multiple base-stations. In the example of FIG. 1, UE 101 is housed in anchor eNB1, which is referred to as an anchor eNB of the UE. UE anchor can be relocated to another eNB by handover. For example, UE 101 may handover to anchor eNB2 when UE 101 moves from location 1 to location 2. UE serving cell(s) can be controlled by drift eNB3 and/or drift eNB4 that is different from anchor eNB1, which is referred to as a drift eNB of the UE. The Anchor-Drift concept is only applicable to UEs in RRC connected mode. As illustrated in FIG. 1, UE 101 establishes an RRC connection with anchor eNB1 over a primary serving cell (e.g., PCELL with anchor eNB1), while served by one or more drift eNBs over secondary serving cells (e.g., SCELL1 by eNB3 and/or SCELL2 by eNB4).

When UE 101 is served by both anchor eNB1 and drift eNB3/eNB4, the control of UE 101 and the user plane functionality is split between the anchor eNB1 and the drift eNB3/eNB4. Since a drift eNB and an anchor eNB may not be physically collocated, there should be transmission medium and interface between the anchor eNB and the drift eNB. Assume Xn interface is introduced for communications between the anchor eNB and the drift eNB. From real deployment perspective, it cannot always assume the ideal backhaul connections, e.g., optical fiber, exist between the anchor eNB and the drift eNB.

To avoid the backhaul delay and overhead due to the information exchange between the anchor eNB and the drift eNB, and to improve the flexibility and efficiency of scheduling, independent scheduler should be located in the drift eNB (assume the anchor eNB has its own scheduler originally). As a result, the channel status report, e.g., CQI, PMI, RI, and so on, of the carriers in the drift eNB may be directly reported to the drift eNB. In such case, the anchor eNB hardly knows the radio condition of the SCELLs in the drift eNB for a specific UE if the drift eNB does not forward the channel quality information to the anchor eNB. Even if the drift eNB forwards such information to the anchor eNB, the anchor eNB cannot respond to the deterioration of radio condition in the drift eNB timely due to the backhaul latency. It is possible that the anchor eNB still delivers/ acquires data packets to/from the drift eNB normally even the radio link on the drift eNB becomes too bad to perform reliable data transmission. The anchor eNB continues forwarding the data uselessly until it is aware of the situation, since the data cannot be scheduled by the drift eNB due to the bad channel condition. From UE perspective, PDCCH monitoring, periodic CQI and SRS reporting will be performed normally on the SCELL until the SCELL is deactivated by the network, which is power wasting. Therefore, RLM/RLF in at least one of the serving cells in the drift eNB can reduce the complexity of the network implementation and UE power consumption.

In the case of free multiplexing, the transmission path for each radio bearer can be selected dynamically based on the instantaneous channel and load conditions. It is thus possible that all the radio bears including DRBs, SRB1 and/or SRB2 are transmitted through the drift eNB for load balance. In this case, RLM/RLF should be done in at least one of the serving cells in the drift eNB, since the RRC connection is essentially maintained on the drift eNB. In other cases where the drift eNB is S1 connected to the Serving Gateway, i.e., data packets do not need to be forwarded from the anchor eNB, RLM/RLF should also be done in at least one of the serving cells in the drift eNB so that the anchor eNB can do the radio bearer reconfiguration for the drift eNB if the radio link quality in the drift eNB is degraded.

In accordance with one novel aspect, considering the advantages and the use cases mentioned above, configurable RLM/RLF handling is proposed in this invention. In addition, RLF reporting and reaction after RLF report received by the network are proposed in details below with accompanying drawings.

Figure 2:
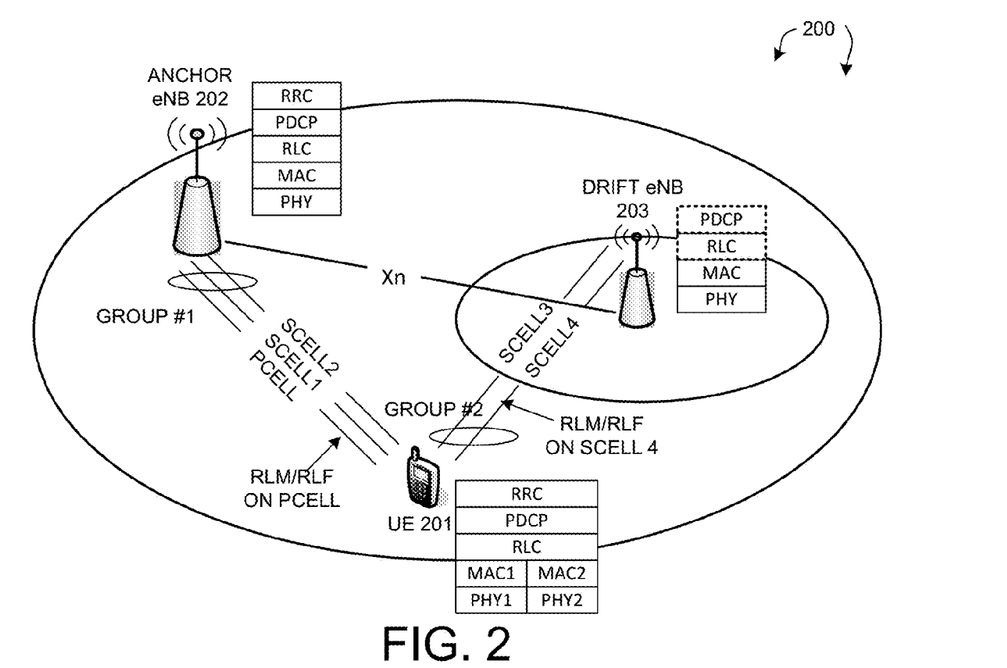
FIG. 2 illustrates a small cell network with inter-eNB carrier aggregation (CA) and RLF/RLM mechanism in accordance with one novel aspect.

FIG. 2 illustrates a small cell network 200 with inter-eNB carrier aggregation and RLF/RLM mechanism in accordance with one novel aspect. Small cell network 200 comprises UE 201, an anchor eNB 202 for UE 201 and a drift eNB 203 for UE 201. For inter-eNB carrier aggregation scenario (assumed ideal backhaul between eNBs) and inter-eNB dual connectivity scenario (assumed non-ideal backhaul between eNBs), at least one component carrier (CC) is from one eNB and at least one CC is from the other eNB. These CCs are aggregated to UE 201. Among the aggregated CCs, one CC is configured as PCELL and other CCs are configured as SCELLs. In the example of FIG. 2, CCs from the same eNB form a cell group. Typically, CCs in the same cell group have the same TA value and/or have the same/similar pathloss phenomenon. For example, PCELL, SCELL1, and SCELL 2 from anchor eNB 202 to UE 201 have the same TA value, while SCELL3 and SCELL4 from drift eNB 203 to UE 201 have the other TA value. As a result, PCELL, SCELL1, and SCELL2 are configured as CC group #1, and SCELL3 and SCELL4 are configured as CC group #2. In one novel aspect, RLM/RLF is not only applied on PCELL for CC group #1 for maintaining RRC connection, but also applied on SCELL4, which is assumed to be configured as the pathloss/timing reference cell for CC group #2.

When a UE establishes a radio resource control (RRC) to a radio access network via its anchor eNB, a primary cell (PCELL) will be configured to a UE by the anchor eNB, where the associated PHY, MAC, RLC and PDCP entities should be established in the UE side, responsible for the control and data transmission and reception through the anchor eNB. In the UE anchor-based architecture, the cell addition, modification, release procedure in the drift eNB can apply the same procedure as it in the carrier aggregation, i.e., PCELL change is through RRC connection reconfiguration with mobility control information and SCELL change is through RRC connection reconfiguration without mobility control information.

In the current UE architecture, a common MAC entity is equipped at a UE, where all serving cells configured to the UE will be associated to the common MAC entity. However, in the UE anchor-based architecture, since the channel qualities to the anchor and the drift eNBs may be uncorrelated, independent HARQ processes to each eNB are expected. Besides, the scheduling policies of different eNBs may be independent. Thus, in the UE side, different PHY and MAC entities from those associated to the anchor eNB will be expected to associate with a drift eNB when a first cell in the drift eNB is configured to a UE. In other words, serving cells from one eNB will be associated to one MAC entity and serving cells from a different eNB will be associated to a different MAC entity. The association means to adopt the parameter settings configured from an eNB for a component carrier (CC). The MAC functions include mapping between logical channels and transport channels; multiplexing of MAC SDUs from one or different logical channels onto transport blocks (TB) to be delivered to the physical layer on transport channels; de-multiplexing of MAC SDUs from one or different logical channels from transport blocks (TB) delivered from the physical layer on transport channels; scheduling information reporting; error correction through HARQ; priority handling between UEs by means of dynamic scheduling; priority handling between logical channels of one UE; Logical Channel prioritization; and transport format selection, etc.

In the example of FIG. 2, when PCELL in anchor eNB 202 is configured for UE 201, the corresponding PHY sublayer (PHY1) is initialized and one MAC entity (MAC1), and/or RLC entities and PDCP entities should be established in the UE side, responsible for data transmission and reception through anchor eNB 202. Later on, when a first cell (SCELL3) in drift eNB 203 is configured to UE 201, the corresponding PHY sublayer (PHY2) is initialized and one MAC entity (MAC2), and/or RLC entities and PDCP entities should be established in the UE side, responsible for data transmission and reception through drift eNB 203, where the new MAC entity MAC2 should be enabled or to be set up corresponding to SCELL3. If a MAC entity is implemented by hardware, the functions of this MAC entity should be enabled and configured. If a MAC entity is implemented by software, the functions of this MAC entity should be added/configured.

Figure 3:
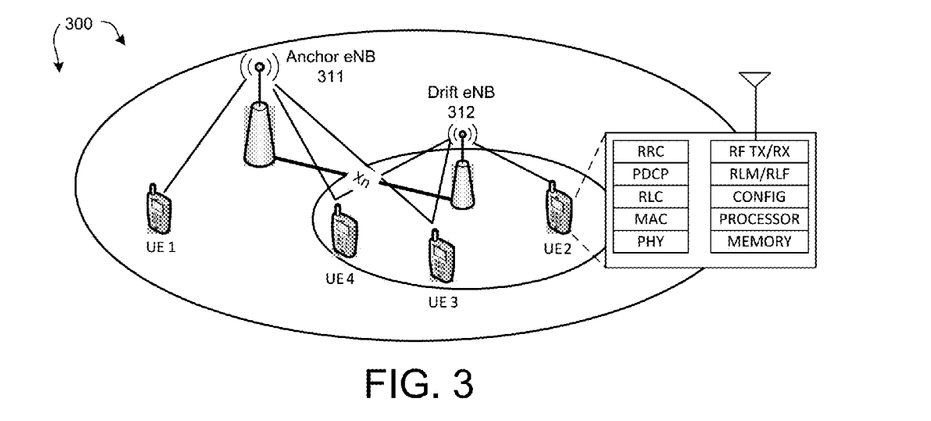
FIG. 3 illustrates a mobile communication network having UEs capable to support CA and small cell operation.

FIG. 3 illustrates a mobile communication network 300 having UEs capable to support carrier aggregation and small cell operation. Mobile communication network 300 comprises four UEs (UE1-UE4) and an anchor eNB 311 and a drift eNB 312. UE1 is served by eNB 311 and UE2 are served by eNB 312 with intra-eNB carrier aggregation. On the other hand, UE3 and UE4 are served by both eNB 311 and eNB 312 with inter-eNB carrier aggregation or inter-eNB dual connectivity. In general, each UE comprises a processor, memory, RF transceiver, antenna, a protocol stack, and various function modules to perform various functionalities of the UE. The different function modules can be implemented by software, firmware, hardware, or any combination thereof. The function modules, when executed by the processor, allow the UE to perform RLM/RLF handling on PCELL as well as on selected SCELLs for each configured cell group. For example, a configuration module configures cell groups for each base station, an RLM/RLF module performs radio link monitoring, radio link failure detection and handling over different serving cells from different cell groups, and an RRC connection management module performs RRC connection setup procedures and maintains RRC connection.

Figure 4:
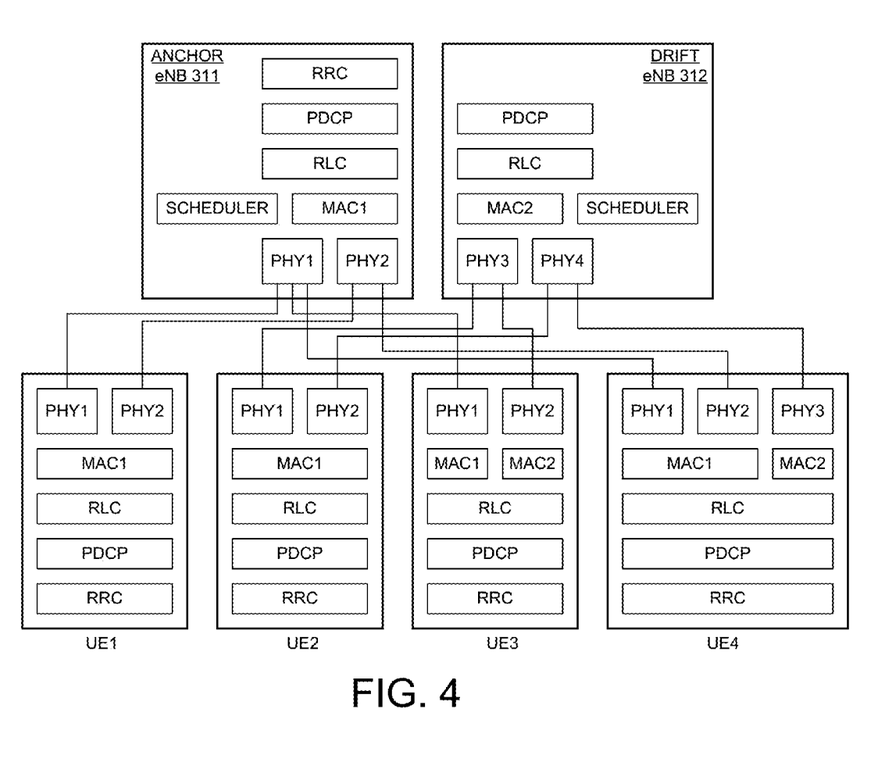
FIG. 4 is a simplified block diagram of protocol stacks in the network side and the UE side in accordance with one novel aspect.

FIG. 4 is a simplified block diagram of protocol stacks in the network side and the UE side of network 300 in accordance with one novel aspect. At network side, the protocol stack in anchor eNB 311 includes PHY, MAC, RLC, PDCP, RRC, and a scheduler. Because drift eNB 312 has its own independent scheduler, the protocol stack in eNB 312 includes at least PHY, MAC, and a scheduler, and possible RLC and PDCP too. At UE side, for UEs equipped with multiple PHY and MAC modules, they can be configured based on its usage for carrier aggregation and small cell operation.

In the example of FIG. 4, for UE1, its multiple PHY modules PHY1 and PHY2 are used to connect to one or multiple cells in anchor eNB 311. For UE2, its PHY modules PHY1 and PHY2 are connected to one or multiple cells in drift eNB 312. For both UE1 and UE2, since they perform intra-eNB carrier aggregation, one common MAC1 is configured to each of them. For UE3, its multiple PHY modules PHY1 and PHY2 are used to connect to anchor eNB 311 and to drift eNB 312. Since anchor eNB 311 and drift eNB 312 are not collocated, independent MAC entities MAC1 and MAC2 are configured corresponding to different eNBs respectively. For UE4, both intra-eNB aggregation and small cell operation are performed, where two PHY modules PHY1 and PHY2 are allocated to operate intra-eNB carrier aggregation, e.g., CA to anchor eNB 311, and PHY3 module is allocated for small cell operation, e.g., connection to drift eNB 312. Intra-eNB carrier aggregation shares one MAC entity MAC1 and small cell operation utilizes the other MAC entity MAC2.

Figure 5:
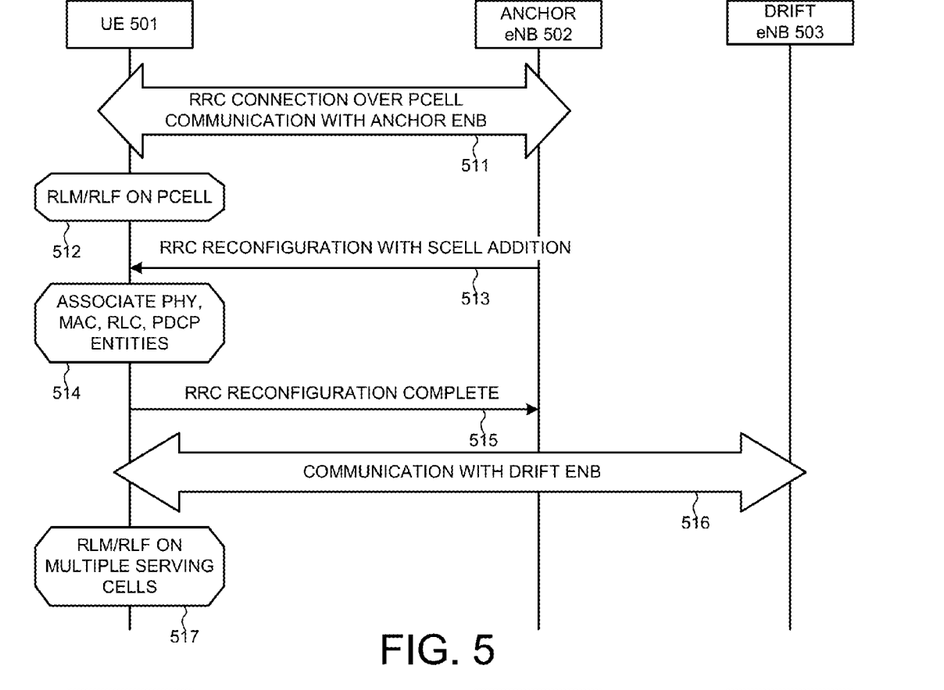
FIG. 5 illustrates configurable RLM/RLF on multiple serving cells.

FIG. 5 illustrates configurable RLM/RLF on multiple serving cells. In step 511, UE 501 establishes an RRC connection and communication with anchor eNB 502 over PCELL, which belongs to a first cell group. In step 512, UE 501 performs RLM and RLF on PCELL. For example, UE 501 monitors the DL quality based on cell-specific reference signal (CRS) to detect the downlink radio link quality for PCELL. UE 501 also compares the estimated DL quality to thresholds $Q_{OUT}$ and $Q_{IN}$ for monitoring downlink radio link quality of PCELL. Typically, $Q_{OUT}$ (out-of-sync) corresponds to an approximate 10% block error ratio of a hypothetical PDCCH transmission taking into account a number of network settings and radio conditions. On the other hand, $Q_{IN}$ (in-sync) is normally a 2% block error ratio.

In step 513, eNB 502 sends an RRC reconfiguration message to UE 501 with SCELL addition. UE 501 identifies whether the SCELL is from the same anchor eNB 502, or from another drift eNB 503. In step 514, UE 501 associates corresponding PHY/MAC/RLC/PDCP entities with the SCELL. If the SCELL is from a different eNB, then the UE needs to associate a new PHY/MAC entity for the SCELL. In step 515, UE 501 replies to eNB 502 with an RRC reconfiguration complete message. In step 516, UE 501 starts to communicate with eNB 503 over the SCELL, which belongs to a second cell group. In step 517, UE 501 performs RLM and RLF on the configured SCELL.

For each cell group, there is at least one RLM/RLF configured serving cell. The RLM/RLF configured cell can be the first activated serving cell in the cell group, a serving cell configured with PUCCH resource in the cell group, a serving cell serving as timing advance reference cell and/or pathloss reference cell in the cell group, and/or a specific cell explicitly configured by the network. The cell group can be cells in a timing advance group (TAG), cell group associated to a transmission point, cell group associated to a common MAC, and/or cells in a pathloss reference group. Take TAG as an example, the TAG can be discriminated by a transmission point, for example, the anchor eNB can configure serving cells in the anchor eNB form a TAG, and serving cells in the drift eNB form another TAG. When RLM/RLF is configured to the serving cells in a TAG, it can only be performed on those serving cells that are activated. The serving cell configured with RLM/RLF cannot be de-activated if any other serving cell in the same group is kept activated.

When an SCELL is activated, if the SCELL belonged cell group has no other cells being configured to perform RLM/RLF, then the SCELL should be configured with RLM/RLF. Otherwise, if an SCELL is not the first cell activated in a group, then the configuration of RLM/RLF on this cell can be decided by the network. In which serving cell RLM/RLF needs to be performed can be configured implicitly based on pre-defined rules or explicitly through RRC signaling message. In a first example, RLM/RLF can be implicitly configured and performed in a serving cell with configured PUCCH resource in a cell group. In a second example, RLM/RLF can be implicitly configured and performed in the first activated serving cell in a cell group controlled by an eNB. In a third example, RLM/RLF can be implicitly configured and performed in a serving cell, which can be used as reference e.g., pathloss reference, and/or timing advance reference. In a fourth example, RLM/RLF can be explicitly configured and performed in a serving cell through RRC signaling message.

The values of constants and timers controlling the RLM/RLF on the serving cells, on which RLM/RLF is performed, should be configured by the network through RRC message. The RLM/RLF parameters include $Q_{OUT}$ and $Q_{IN}$ thresholds, N310/N311/T310 timers, etc. In a first example, the parameters for RLM/RLF constants and timers can be configured per UE, i.e. UE applies the same values as PCELL for the constants and timers controlling the RLM/RLF on the SCELLs. In a second example, the parameters for RLM/RLF constants and timers can be configured per cell group, i.e. the network configures separate values for RLM/RLF constants and timers corresponding to the cell groups generated from the anchor eNB and the drift eNB respectively. In a third example, the parameters for RLM/RLF constants and timers can be configured per serving cell, i.e. the network configures separate values for RLM/RLF constants and timers for each serving cell, in which RLM/RLF will be performed.

Figure 6:
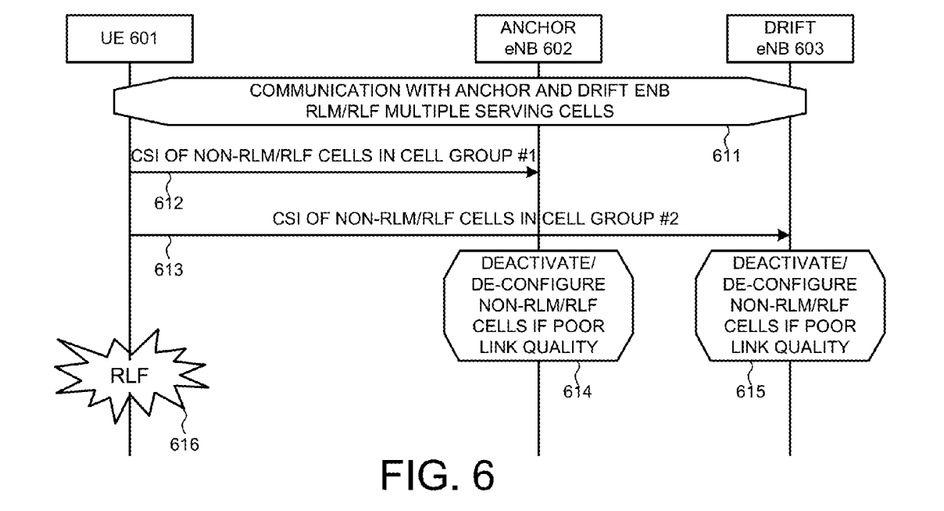
FIG. 6 illustrates RLM/RLF reporting mechanism on multiple serving cells.

FIG. 6 illustrates RLM/RLF reporting mechanism on multiple serving cells. In step 611, UE 601 establishes communication with both anchor eNB 602 and drift eNB 603 and performs RLM/RLF on multiple serving cells of different cell groups. For example, UE 601 performs RLM/RLF on PCELL of cell group #1 of eNB 602, and performs RLM/RLF on one SCELL of cell group #2 of eNB 603. On the other non-RLM/RLF serving cells, UE 601 does not perform any RLM/RLF procedure. As a result, the channel state information (CSI) of the non-RLM/RLF serving cells in a cell group can be reported through any RLM/RLF configured serving cell in the same cell group. In step 612, UE 601 reports CSI for non-RLM/RLF serving cells of cell group #1 to eNB 602. In step 613, UE 601 reports CSI for non-RLM/RLF serving cells of cell group #2 to eNB 603. The eNBs can deactivate/de-configure these poor link quality non-RLM/RLF serving cells before link failure occurs on these serving cells. For example, in step 614, eNB 602 deactivates one of the serving cells in cell group #1 if that cell has poor link quality. Similarly, in step 615, eNB 603 deactivates one of the serving cells in cell group #2 if that cell has poor link quality.

For RLM/RLF serving cells, there are three possible ways of detecting RLF, e.g., in step 616, UE 601 detects RLF. First, in RRC_CONNECTED state, RLF can be detected upon physical layer problems based on N310/N311/T310 mechanism. Second, RLF can be detected upon random access problem indication from the media access control (MAC) layer. Finally, RLF can be detected upon indication from the radio link control (RLC) layer that the maximum number of retransmission has been reached. If RLF happens in the serving cells where RLM/RLF is performed, an RLF message can be sent by the UE. If RLF happens in drift eNB, RLF report can be sent through the anchor eNB or through other drift eNB with good link quality and UL resource, which passes the RLF report to the anchor eNB. If RLF happens in anchor eNB, RLF report can be sent through the drift eNB with good link quality and UL resource. The RLF message should indicate in which serving cell or cell group RLF occurs. If RLF happens in drift eNB, the RLF message should indicate the corresponding cell group ID assigned to the cell group generated from the drift eNB. For example, the cell group ID can be the TAG ID. In another example, the RLF message should indicate the global cell identity or the physical cell identity and/or carrier frequency of the cell where RLF is detected.

In addition, UE should indicate the radio link problem that triggers in the RLF message. In one example, the UE can indicate the triggering of the radio link failure, i.e., downlink out-of-sync, uplink RACH failure, uplink re-transmission failure, and other causes of RLF. UE should also indicate other information for failure problem identification and for network re-configuration and recovery from the failure. For example, the UE can include the latest results of available measurements in the RLF message to the network.

Figure 7:
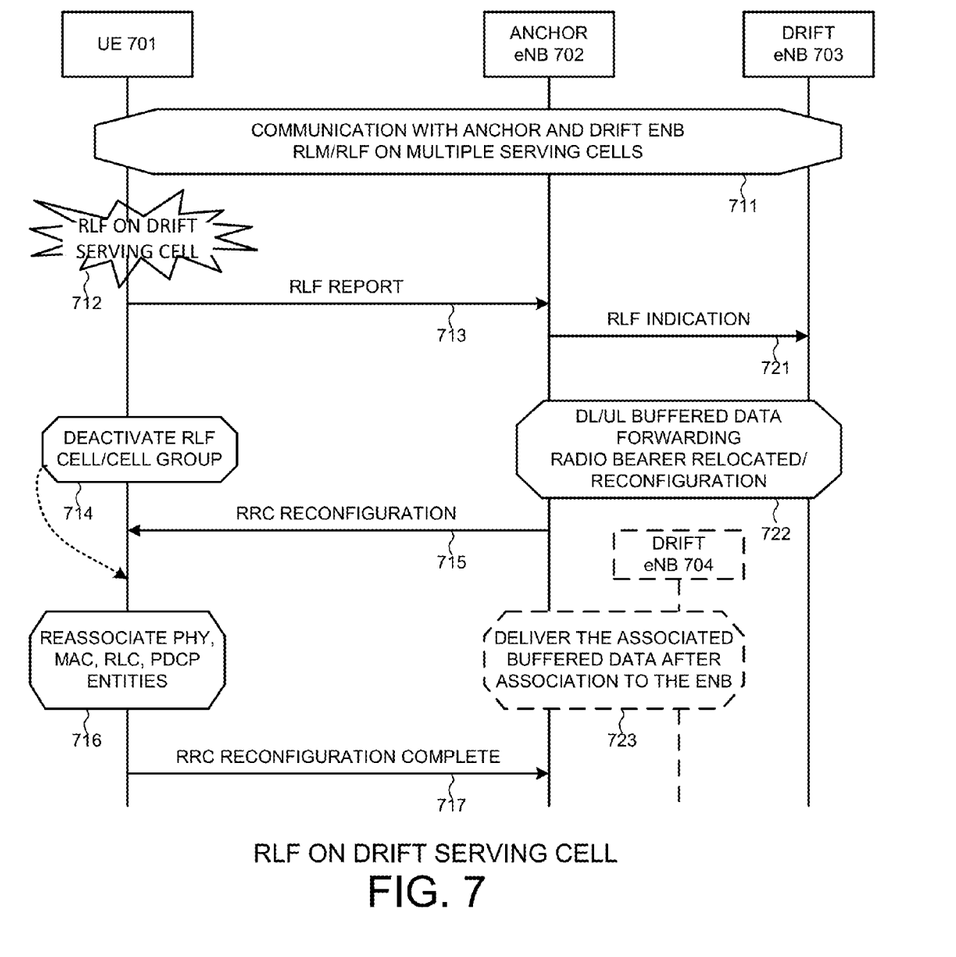
FIG. 7 illustrates a procedure and embodiments when RLF occurs on a drift serving cell.

FIG. 7 illustrates a procedure and embodiments when RLF occurs on a drift serving cell. In step 711, UE 701 establishes communication with both anchor eNB 702 and drift eNB 703 and performs RLM/RLF on multiple serving cells of different cell groups. In step 712, UE 701 detects RLF on a serving cell by drift eNB 703. At the UE side, in step 713, UE 701 sends an RLF report to anchor eNB 702. The RLF serving cell can be deactivated autonomously by UE 701 or can be deactivated or de-configured by the network through explicit command. For example, UE 701 deactivates the RLF cell or cell group autonomously in step 714. Alternatively, UE 701 deactivates the RLF cell or cell group after receiving an RRC reconfiguration message from anchor eNB 702 in step 715. The RRC reconfiguration message is sent to UE 701 for radio bearer reconfiguration and SCELL reconfiguration. In addition, the MAC entity for drift eNB 703 that is associated with the RLF serving cell or cell group can be disabled or released by UE 701 autonomously or by anchor eNB 702 through explicit RRC message for radio bearer reconfiguration. In one embodiment, after all serving cells generated from drift eNB 703 are deactivated, UE 701 disables or releases the corresponding MAC entity. In another embodiment, after applying the RRC message for radio bearer reconfiguration received in step 715, all the radio bearers that are originally associated to the MAC entity for drift eNB 703 are re-configured to the MAC entity for anchor eNB 702 or to another drift eNB 704. UE 701 then disables or releases the corresponding MAC entity where the radio bearers are re-associated to the MAC entity to the other serving eNB in step 716. Finally, in step 717, UE 701 sends an RRC reconfiguration complete message to anchor eNB 702 to complete the SCELL change.

At the network side, upon receiving the RLF report from UE 701, anchor eNB 702 informs drift eNB 703 that RLF on the serving cell or cell group generated from drift eNB 703 has occurred for a specific UE (UE 701), and the UE identification is indicated (step 721). In step 722, anchor eNB 702 stops DL data forwarding to drift eNB 703 for UE 701 upon reception of the RLF report from the UE. In addition, drift eNB 703 should forward the data waiting for transmission or retransmission in the DL buffer to anchor eNB 702. Meanwhile, anchor eNB 702 also requests UL data that is received from UE 701 and buffered in drift eNB 703 to be delivered to anchor eNB 702 through the Xn interface. Upon receiving the RLF indication, drift eNB 703 forwards the UL data that is received from UE 701 and buffered to anchor eNB 702 through Xn interface. Drift eNB 703 also release the MAC entity that is responsible for data transmission to UE 701. Furthermore, anchor eNB 702 relocates the radio bearer that is associated with the MAC entity for drift eNB 703 to other MAC entity. The relocated MAC entity can be the anchor eNB's MAC entity, or another drift eNB's MAC entity, e.g., eNB 704. If the relocated MAC entity belongs to eNB 704, in step 723, anchor eNB 702 delivers the associated buffered data to eNB 704 after association to eNB 704.

Figure 8:
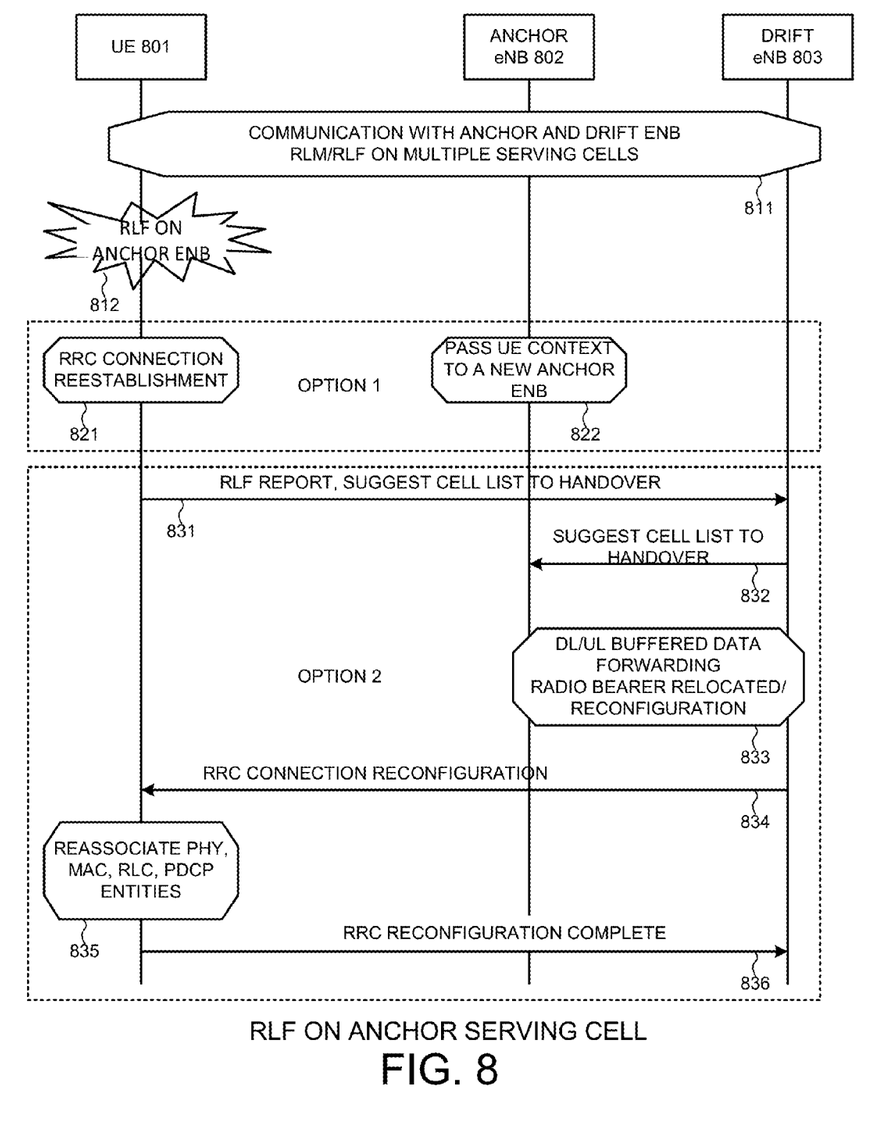
FIG. 8 illustrates a procedure and embodiments when RLF occurs on an anchor serving cell.

FIG. 8 illustrates a procedure and embodiments when RLF occurs on an anchor serving cell. In step 811, UE 801 establishes communication with both anchor eNB 802 and drift eNB 803 and performs RLM/RLF on multiple serving cells of different cell groups. In step 812, UE 801 detects RLF on a primary serving cell by anchor eNB 802. In a first option, UE 801 performs RRC reestablishment procedure in step 821 to reestablish RRC connection to other cells. Original anchor eNB 802 should pass the entire UE context information to a new anchor eNB.

In a second option, UE 801 sends an RLF indicator to drift eNB 803 in step 831. In one embodiment, the RLF indicator may include a suggested cell list for handover. Drift eNB 803 should pass the RLF indicator to anchor eNB 802 in step 832 so that anchor eNB 802 can perform PCELL change through handover procedure to other eNB. For example, UE 801 will be handover to drift eNB 803. In step 833, the original anchor eNB 802 forwards the data waiting for transmission or retransmission in the DL buffer to drift eNB 803. Also, anchor eNB 802 forwards the UL data that is received from UE 801 and buffered to drift eNB 803 through Xn interface. In step 834, drift eNB 803 sends an RRC connection reconfiguration message to UE 801 with mobility information for PCELL change and anchor eNB change. In step 835, UE 801 re-associates its PHY, MAC, RLC, PDCP entities to drift eNB 803, which becomes the new anchor eNB for UE 801. Finally, in step 836, UE 801 replies an RRC connection complete message back to the new anchor eNB 803.

Figure 9:
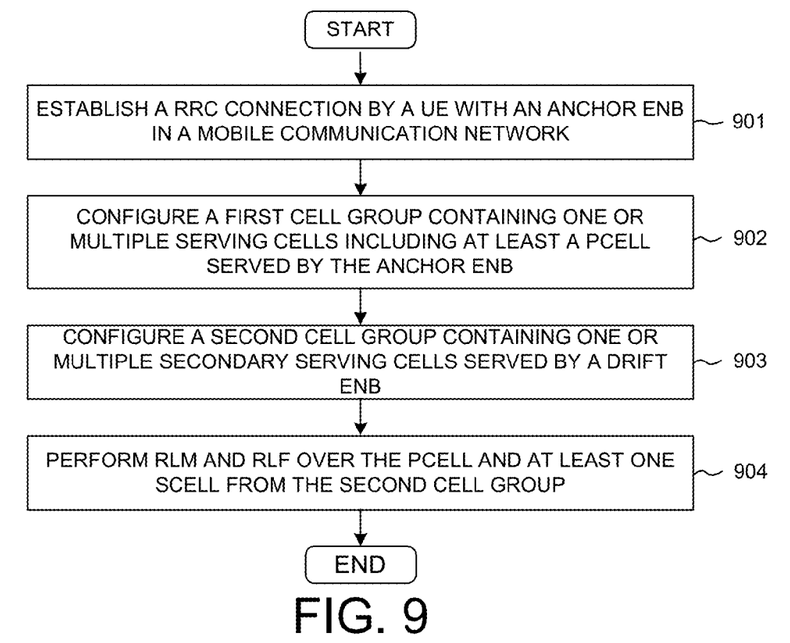
FIG. 9 is a flow chart of a method of RLM and RLF handling from UE perspective in a small cell network in accordance with one novel aspect.

FIG. 9 is a flow chart of a method of RLM and RLF handling from UE perspective in a small cell network in accordance with one novel aspect. In step 901, a user equipment (UE) establishes an RRC connection with an anchor eNB in a mobile communication network. In step 902, the UE configures a first cell group containing one or multiple serving cells including at least one PCELL served by the anchor eNB. In step 903, the UE configures a second cell group containing one or multiple serving cells served by a drift eNB. In step 904, the UE performs RLM and RLF over the PCELL and at least one SCELL from the second cell group. The RLM/RLF configured SCELL may be a first activated serving cell in the second cell group, a serving cell configured with PUCCH resource in the second cell group, a serving cell used as timing advance reference or pathloss reference in the second cell group, and/or a cell explicitly configured by the network. In one embodiment, the UE associates a first MAC entity with the anchor eNB in handling scheduling from the anchor eNB, and associates a second MAC entity with the drift eNB in handling scheduling from the drift eNB.

Figure 10:
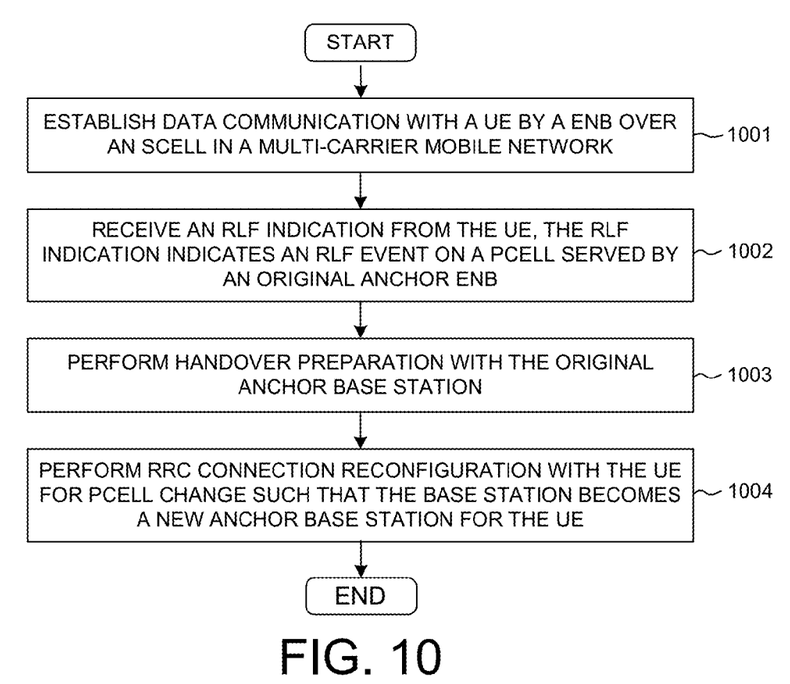
FIG. 10 is a flow chart of a method of RLM and RLF handling from eNB perspective in a small cell network in accordance with one novel aspect.

FIG. 10 is a flow chart of a method of RLM and RLF handling from eNB perspective in a small cell network in accordance with one novel aspect. In step 1001, a base station (eNB) establishes data communication with a UE over an SCELL in a multi-carrier mobile communication network. The base station is a drift eNB for the UE. In step 1002, the eNB receives an RLF indication from the UE. The RLF indication indicates an RLF event on a PCELL served by an original anchor eNB. In one embodiment, the RLF indication includes a suggest cell list received from the UE for handover. In step 1003, the eNB performs handover preparation with the original anchor eNB. For example, the original eNB forwards DL/UL buffered data to the eNB. In step 1004, the eNB performs RRC connection reconfiguration with the UE for PCELL change such that the eNB becomes a new anchor eNB for the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
  establishing a radio resource control (RRC) connection by a user equipment (UE) with an anchor base station (eNB) in a mobile communication network;
  configuring a first cell group containing one or multiple serving cells served by the anchor eNB, wherein the first cell group contains at least a primary serving cell (PCELL), wherein the UE associates a first MAC entity with the anchor eNB in handling scheduling from the anchor eNB;
  configuring a second cell group containing one or multiple secondary serving cells (SCELLs) served by a drift base station (eNB), wherein the UE associates a second MAC entity with the drift eNB in handling scheduling from the drift eNB; and
  performing radio link monitoring (RLM) and radio link failure (RLF) procedure over the PCELL and at least one SCELL from the second cell group, wherein the UE detects an RLF event on the PCELL and de-associating the first MAC entity with the anchor eNB, and wherein the UE also sends an RLF indication to the drift eNB.

2. The method of claim 1, wherein the SCELL is configured with physical uplink control channel (PUCCH) radio resource or is used as pathloss reference and/or timing advance reference.

3. The method of claim 1, further comprising:
  detecting an RLF event on the SCELL and sending an RLF report to the anchor eNB; and
  de-activating/de-configuring the SCELL autonomously or by the network through an explicit command.

4. The method of claim 1, further comprising:
  detecting an RLF event on the PCELL; and
  performing RRC connection reestablishment procedure with the network.

5. The method of claim 1, wherein the RLF indication also includes a cell list for handover.

6. The method of claim 1, further comprising:
  receiving an RRC reconfiguration from the drift eNB for PCELL and anchor eNB change; and
  re-associating the first MAC entity with the drift eNB and sending an RRC reconfiguration complete message to the drift eNB.

7. A user equipment (UE), comprising:
  a radio resource control (RRC) module that establishes an RRC connection with an anchor base station (eNB) in a mobile communication network;
  a cell-group configuration module that configures a first cell group containing one or multiple serving cells served by the anchor eNB, wherein the first cell group contains at least a primary serving cell (PCELL), wherein the cell-group configuration module also configures a second cell group containing one or multiple secondary serving cells (SCELLs) served by a drift base station (eNB);
  a first MAC entity that associates with the anchor eNB in handling scheduling from the anchor eNB;
  a second MAC entity that associates with the drift eNB in handling scheduling from the drift eNB; and
  a radio link monitoring (RLM) module and a radio link failure (RLF) module that performs RLM/RLF procedure over the PCELL and at least one SCELL from the second cell group, wherein the UE detects an RLF event on the PCELL and de-associating the first MAC entity with the anchor eNB, and wherein the UE also sends an RLF indication to the drift eNB.

8. The UE of claim 7, wherein the SCELL is configured with physical uplink control channel (PUCCH) radio resource or is used as pathloss reference and/or timing advance reference.

9. The UE of claim 7, wherein the UE detects an RLF event on the SCELL and sends an RLF report to the anchor eNB, and wherein the UE de-activates/de-configures the SCELL.

10. The UE of claim 7, wherein the UE detects an RLF event on the PCELL, and wherein the UE performs RRC connection reestablishment procedure with the network.

11. The UE of claim 7, wherein the RLF indication also includes a cell list for handover.

12. The UE of claim 7, further comprising:
  a receiver that receives an RRC reconfiguration from the drift eNB for PCELL and anchor eNB change; and
  a transmitter that sends an RRC reconfiguration complete message to the drift eNB after the UE re-associates the first MAC entity with the drift eNB.

13. A method, comprising:
  establishing data communication with a user equipment (UE) by a base station over a secondary serving cell (SCEL) in a multi-carrier mobile communication network;
  receiving a radio link failure (RLF) indication from the UE, wherein the RLF indication indicates an RLF event on a primary serving cell (PCELL) served by an original anchor base station;
  performing handover preparation with the original anchor base station; and
  performing RRC connection reconfiguration with the UE for PCELL change such that the base station becomes a new anchor base station for the UE.

14. The method of claim 13, wherein the base station receives a suggest cell list for handover from the UE and sends the cell list to the original anchor base station.

15. The method of claim 13, wherein the handover preparation involves receiving buffered data forwarded from the original anchor base station through Xn interface.

16. The method of claim 13, wherein the handover preparation involves radio bearer reestablishment and reconfiguration.

17. The method of claim 13, wherein the RRC connection reconfiguration involves sending an RRC connection reconfiguration message to the UE and receiving an RRC connection reconfiguration complete from the UE.

* * * * *